(12) United States Patent
Rodriguez et al.

(10) Patent No.: US 6,453,373 B1
(45) Date of Patent: Sep. 17, 2002

(54) METHOD AND APPARATUS FOR DIFFERENTIAL STROBING

(75) Inventors: Pablo M. Rodriguez, Burlingame; Alper Ilkbahar, San Jose, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,985

(22) Filed: Dec. 30, 1999

(51) Int. Cl.⁷ .......................... G06F 13/14; G06F 13/00
(52) U.S. Cl. .......................... 710/58; 710/60; 710/107; 710/110; 710/305; 713/400; 713/600
(58) Field of Search ................................. 709/317, 400, 709/201, 248; 713/400, 401, 500, 501, 502, 503, 600; 710/126, 129, 107, 110, 60, 61, 305, 306, 58, 108; 365/206, 207

(56) References Cited

U.S. PATENT DOCUMENTS

| 4,967,390 | A | | 10/1990 | Rendina et al. ............. 364/900 |
| 5,913,046 | A | | 6/1999 | Barth et al. ................. 395/384 |
| 5,964,856 | A | * | 10/1999 | Wu et al. .................... 710/110 |
| 6,092,212 | A | * | 7/2000 | Muljono et al. ............ 713/600 |
| 6,317,801 | B1 | * | 11/2001 | Ilkbahar et al. ............... 710/58 |

FOREIGN PATENT DOCUMENTS

| EP | 0 392 565 | 10/1990 |
| EP | 0 394 599 | 10/1990 |
| EP | 0 610 862 | 8/1994 |

* cited by examiner

Primary Examiner—Ario Etienne
(74) Attorney, Agent, or Firm—Kenyon & Kenyon

(57) ABSTRACT

A method for ensuring proper strobe pre and post driving between a first data transfer and a second data transfer in a microprocessor system. The method includes generating a first strobe signal and a second strobe signal, pre-driving one of said first and second strobe signals before the first data transfer, post driving said pre-driven signal, determining which of said first and second strobe signals will be post driven, and pre-driving one of said first and second strobe signals before the second data transfer.

23 Claims, 5 Drawing Sheets

METHOD AND APPARATUS FOR DIFFERENTIAL STROBING

FIELD OF THE INVENTION

The present invention relates generally to data transfer on a communications bus. More particularly, the present invention relates to a mechanism for strobe phase tracking during a master changeover on the communication bus.

BACKGROUND OF THE INVENTION

A multiprocessor system increases system performance because multiple processors operate in parallel. A typical multiprocessor system has a number of processors attached to a communication bus. Although each processor can only use the bus one at a time, bus protocols has been developed to optimize the bus utilization.

In such a multiprocessor system, one part of the communication bus, the data bus, is one of the most important resources because all of the information exchanges take place on this bus. It is therefore important that the data bus is efficiently utilized. In the multiprocessor system the data is transferred from processor to processor in accordance with a predefined clocking scheme. A system bus clock typically clocks data out of a sending processor and into a receiving processor. Consequently, it takes one complete clock cycle of a system bus clock to transfer data from one processor to another processor. Data can be transferred in a source synchronous fashion in order to increase the speed of the data transmission. In source synchronous transmission, the data transfer is typically clocked by two differential strobe signals which are phase shifted such that the active edges as provided by both strobes correspond to a fast transfer clock which is typically shorter than the period of the system bus clock. These strobes are used by the receiving processor to latch the data.

Differential strobe signals mean that both active low and active high strobes are used. This introduces complexity in an active low bus by requiring that one of the strobes be pre and post driven from and to a steady state logic 1 value. Furthermore, the pre and post driving of the strobes need to be taken into consideration at the receiving processors to ensure proper data capture and to decide which strobe needs to be pre driven during a next data transfer. The main problem associated with this differential multiprocessor approach is continuous data transfers with changes in the bus ownership, i.e., when another processor becomes the sending processor or "master" and takes over the data bus.

Accordingly, there is a need in the technology to have a mechanism for strobe phase tracking to ensure proper strobe pre and post driving as well as accurately capturing data.

SUMMARY OF THE INVENTION

Embodiments of the present invention are directed to a method and apparatus for ensuring proper strobe pre and post driving between a first data transfer and a second data transfer in a computing system. The method includes generating a first strobe signal and a second strobe signal, pre-driving one of said first and second strobe signals before the first data transfer, determining which of said first and second strobe signals will be post driven, and pre-driving one of said first and second strobe signals before the second data transfer.

BRIEF DESCRIPTION OF THE DRAWINGS

The advantages of the present invention will become more readily apparent to those ordinarily skilled in the art after reviewing the following detailed description and accompanying drawings, wherein.

DETAILED DESCRIPTION OF THE INVENTION

Disclosed hereinafter are embodiments of a strobe phase tracking mechanism for determining which strobe to pre-drive and post-drive during a master changeover on a communications bus. The strobe phase tracking mechanism allows the proper strobe to be asserted which provides for efficient data transfer on the communications bus.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
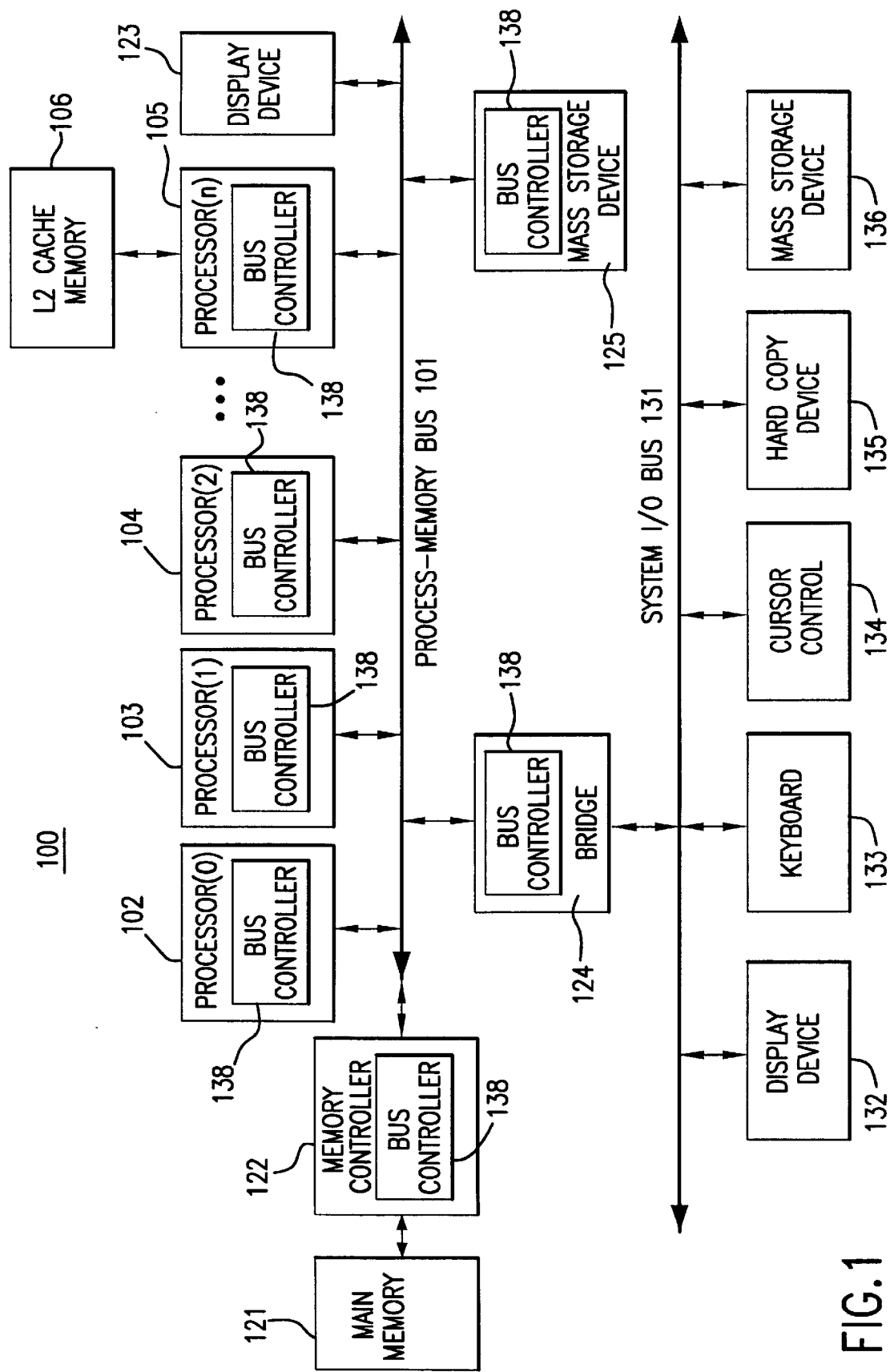
FIG. 1 illustrates a typical block diagram of a computing system.

FIG. 1 is a block diagram of a multi-processor computer system which may be used with embodiments of the present invention. Computer system 100 includes processor-memory bus 101 for communication between different processors coupled to bus 101. Also coupled to processor-memory bus 101 are agents such as bus bridges, memory devices, peripheral devices, etc. Processor-memory bus 101 includes arbitration, address, data and control busses (not shown). In one embodiment, each of processors 102, 103, 104, and 105 include a small, extremely fast internal cache memory (not shown), commonly referred to as a level one (L1) cache memory for temporarily storing data and instructions on the same integrated circuit as its associated processor. In addition, a larger, level two (L2) cache memory 106 is coupled to processor 105 for temporarily storing data and instructions for use by processor 105. In other embodiments, an L2 cache such as memory 106 can be coupled to any one of processors 102–105.

Processor-memory bus 101 provides access to the memory and input/output (I/O) subsystems. Memory controller 122 is coupled to processor-memory bus 101 for controlling access to a random access memory (RAM) or other dynamic storage device 121 (commonly referred to as main memory) for storing information and instructions for processors 102–105. Display device 132, keyboard device 133, cursor control device 134, hard copy device 135, and mass storage device 136 are coupled to system I/O bus 131 and to processor-memory bus 101 through bus bridge 124. Bridge 124 is coupled to processor-memory bus 101 and system I/O bus 131 to provide a communication path or gateway for devices on either processor-memory bus 101 or I/O bus 131 to access or transfer data between devices on the other bus. Bridge 124 is an interface between system I/O bus 131 and processor-memory bus 101. I/O bus 131 communicates information between peripheral devices 132–136.

Processors 102–105, bus bridge 124, mass storage device 125, and memory controller 122 each include a bus controller 138. Bus controller 138 controls communication over processor-memory bus 101 when the processor or agent containing it has control of processor-memory bus 101.

Figure 2:
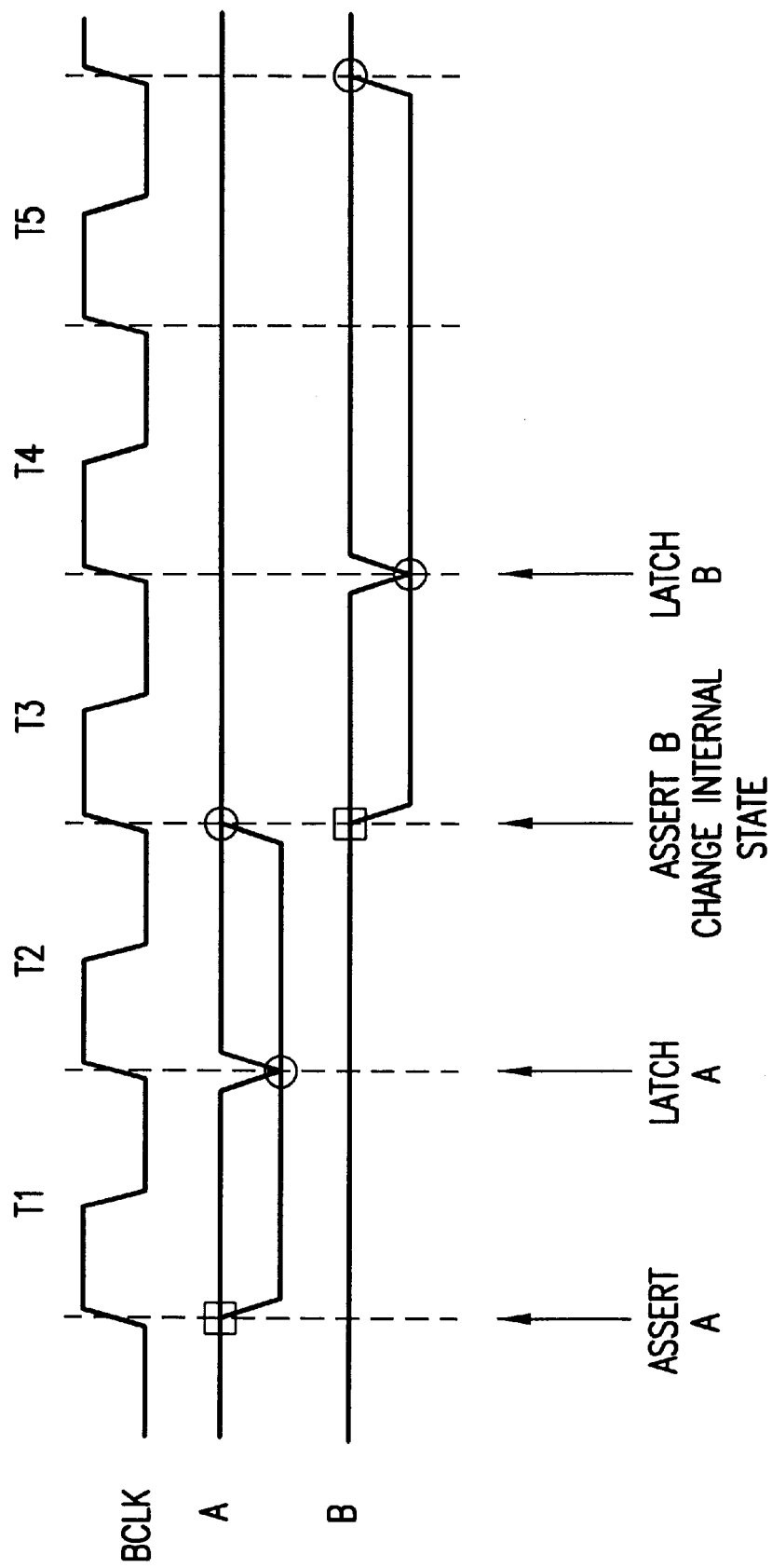
FIG. 2 is a typical timing diagram for the computing system of FIG. 1.

FIG. 2 is a timing diagram showing what occurs on the bus during a common clock transaction. In timing diagrams herein, a square symbol indicates that a signal is driven, a circle symbol indicates that a signal is sampled (latched, or captured), and a triangle symbol indicates that the signal is received, or observed. Is used herein, the term "asserted" implies that a signal is driven to its active level and the term "deasserted" implies that the signal is driven in its inactive logic level.

Bus clock signal BCLK is active on its rising edge. At the start of clock cycle T1, signal A is asserted on the bus. At the start of T2, BCLK latches signal A. At the start of T3, signal B is asserted in response to the latching of signal A. Signal A changes state to its original, inactive state in T2. It can be seen from FIG. 2 that signal B is asserted in response to signal A two BCLK cycles after signal A is asserted.

Figure 3:
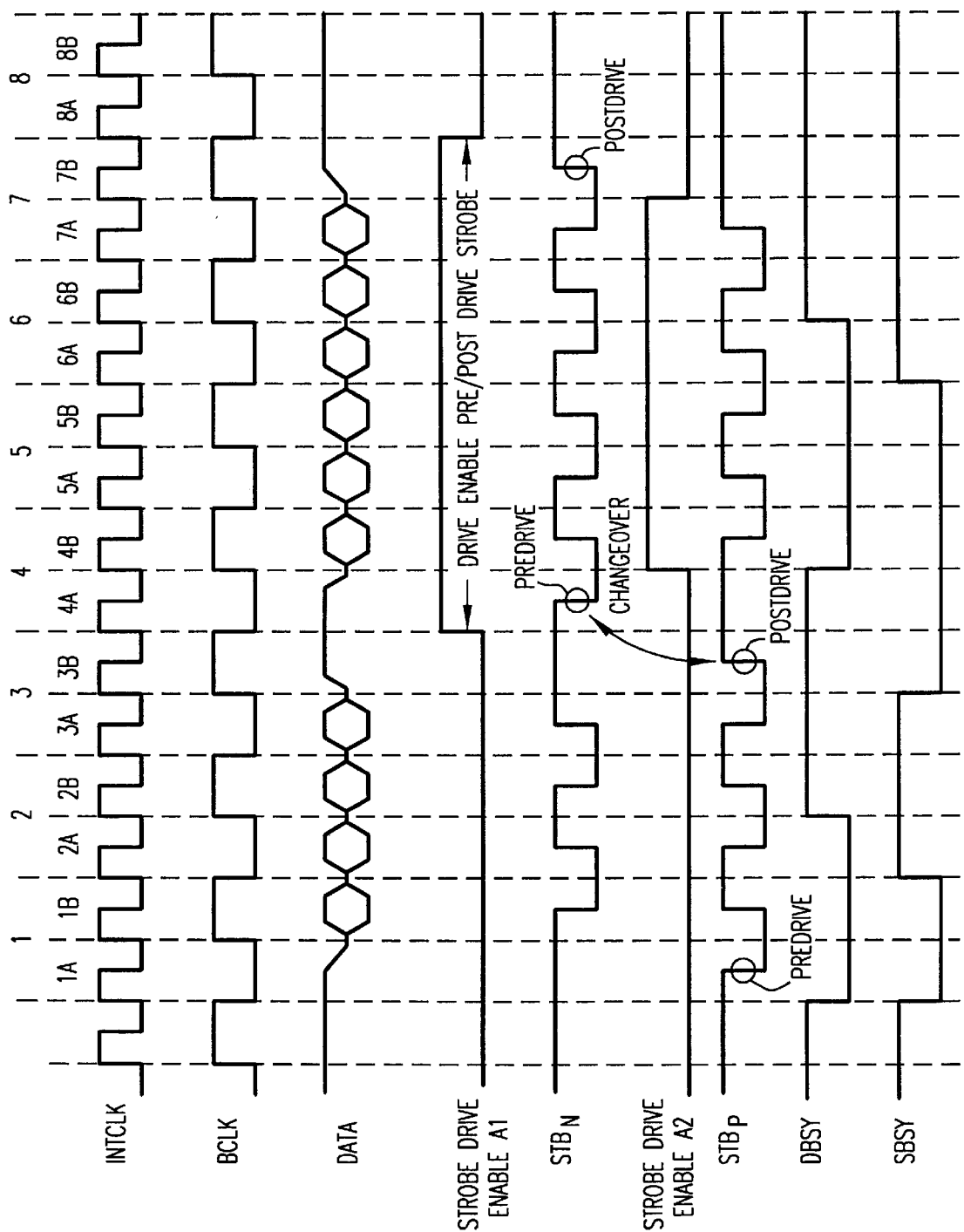
FIG. 3 is timing diagram illustrating timing according to an embodiment of the present invention.

FIG. 3 is a timing diagram illustrating source synchronous data transmission according to one embodiment of the present invention. The INTCLK signal is the representative clock internal to the processor that is used to synchronize other signals and clock the data on the data bus. The INTCLK is shown to illustrate the relationship among the various signals. The BCLK signal is the clock as seen on the bus and is typically synchronized with the INTCLK signal in some fashion. In this embodiment, the INTCLK signal is twice faster than the BCLK signal. The DATA signal is the data as seen on the bus. In the embodiment as illustrated in FIG. 3, the DATA signal is transferred at twice the normal transfer rate. When data is not driven by any of the bus agents, it become high impedance and is remains at a logic 1 value as shown in INTCLK 1A, 3B, 4A, 7B, 8A and 8B in FIG. 3.

STBp and STBn are two strobe signals that are use to drive the data onto the bus. STBp and STBn signals used to synchronize data transfer. Any receiving bus agent or processor can use the STBp and STBn signal to latch the data. The use of two strobe signals (instead of one) for strobing data eliminates the jittering problem associated with single strobe approach. Another advantage of using two strobe signal is reduction in the common mode signal noise problem.

Furthermore, it is difficult to clock the data on the bus at a rate twice as fast as the bus clock with only one strobe.

The STBp and STBn signals are phase shifted from each other although the phase shifting does not occur at all clocks. By shifting the phase, i.e., shifting the edge of one signal by an amount equal to half the BCLK signal the receiver can examine both STBp and STBn to obtain the data. The consequence of the phase shift is that the DATA is valid when there are transitions at both STBp and STBn. It does not matter which one of STBp and STBn is positive-going or negative-going.

To have this complementary edge feature, one of the data strobe signals is asserted before the data is actually strobed. Typically, this assertion is one half bus clock before the first crossing of the strobes which happens at the center of the data valid window as shown in FIG. 3. This early assertion is referred to as "pre-drive" as shown from INTCLK signal 1A of STBp and from INTCLK signal 4A of STBn. Thereafter in the next clock, the other data strobe is asserted at the instant when the pre-drive data strobe toggles. With this pre-drive feature, two data strobes form a pair of complementary edges at the time the data itself is available. From there on, the two data strobes toggle in the normal process corresponding to the data.

Thus, by providing the edge-complementary data strobe with pre-drive, a faster transfer rate is achieved. In FIG. 3, the internal clock is twice faster than the bus clock. With pre-drive dual data strobe, the data can be transferred at twice the normal rate: two data are available in one bus clock. According to an embodiment of the present invention, one of the strobe signals must also be post driven when a every time a data transfer ends (i.e., pre-drive, transfer, post-drive). A changeover is defined as another processor or agent taking control of the bus. Also a changeover is further defined as the time frame when the post-drive of one processor is in the same bus clock as the pre-drive in another processor.

As shown in FIG. 3, internal signals, strobe enable A1 and strobe enable A2 indicate the internal state of a transmitting processor and how it affects external signals. According to the present invention, these signal tell output strobe buffers of a transmitting processor or agent to drive the strobes out of the buffer. The DBSY signal is the data bus busy signal. This signal is asserted by a transmitting processor or agent to indicate it is using or is about to use or has used the data bus. The SBSY signal is the strobe busy signal. This signal is asserted by the transmitting processor or agent to indicate it is using or about to use the strobe lines of the bus.

In FIG. 3 the two strobe signals STBp and STBn clock the data at twice the clock rate of the BCLK. The DATA is available during the second half of BCLK 1, or during INTCLK 1B. STBp is pre-driven at BCLK 1. At BCLK 1, STBp goes high while STBn is driven low. STBp and STBn continue to toggle each at the rate of bus clock.

At BCLK 3, the data transfer of the block initiated by the STBp is terminated. The next data transfer takes place after one dead clock (on transmission of data) covering BCLK 3 and BCLK 4. According to the present invention, a sequence of events occurs which results in the correct strobe being pre-driven and incorrectly latched input data being ignored. At the end of the transaction of the transmitting processor, the transmitting processors competes the transaction and post-drives the correct strobe. As shown in FIG. 3, STBn now pre-drives the data at BCLK 4. Then, STBn will toggle at BCLK 4 at the same instant when STBp toggles at clock 4, starting the clocking of data in the next data transfer.

Figure 4:
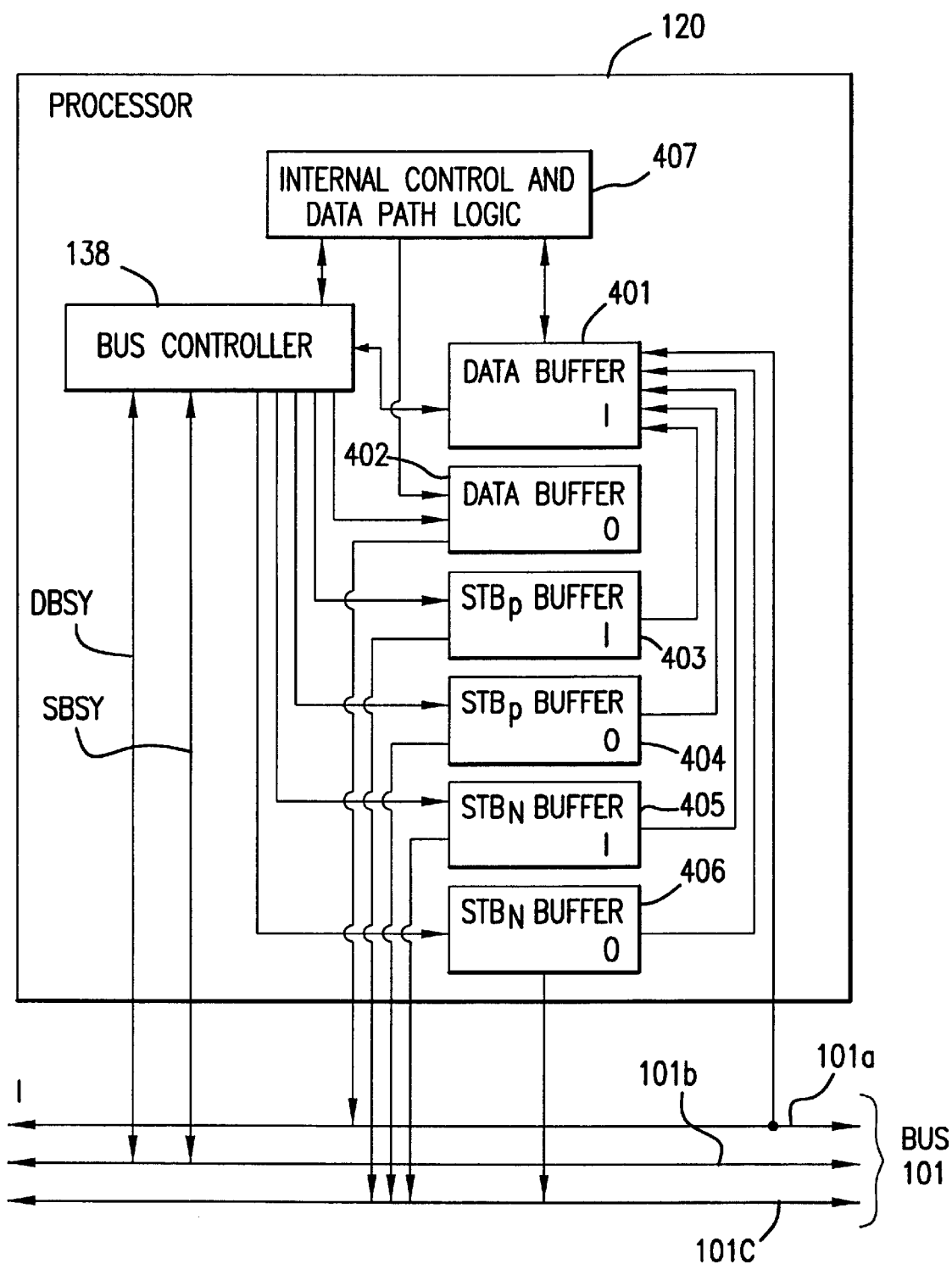
FIG. 4 is a block diagram of a processor according to an embodiment of the present invention.

FIG. 4 is a block diagram illustrating a processor or agent in more detail according to one embodiment of the present invention. Agent 102 internal control and data path logic 407, bus controller 138 data buffers 401 and 402 and strobe buffers 403–406.

As described below, bus controller 138, controls communication over bus 101 when the processor or agent containing it has control of the bus. Internal control and data path logic 407, operates as the processor's core. Agent 102 also may include a sets of data buffers 401 and 402. Data buffers 401 may be an input buffer and data buffer 402 may be an output buffer. However, alternate embodiments could include more or fewer data buffers or data buffers that could be used for both input and output rather than having two different sets of buffers.

Data buffer 402 temporarily stores data that is being transferred from processor 120 to another processor via the data line (101 *a*) of bus 101. Data buffer 401 temporarily stores data that is being transferred from another processor to processor 120 via bus 101.

Strobe buffers 403–406 include STBp input and output buffers 403 and 404, respectively, and STBn input and output buffers 405 and 406, respectively. The strobe buffers receive signals from controller 138 for outputting the correct strobe. In addition, strobe buffers input and receive strobe signals from strobe line (101*c*) of bus 101. Controller 138 also receives and sends DBSY and SBSY signals from the control line (101*b*) of bus 101 to indicate when a processor is about to use the data bus and the strobe lines of the bus.

Figure 5:
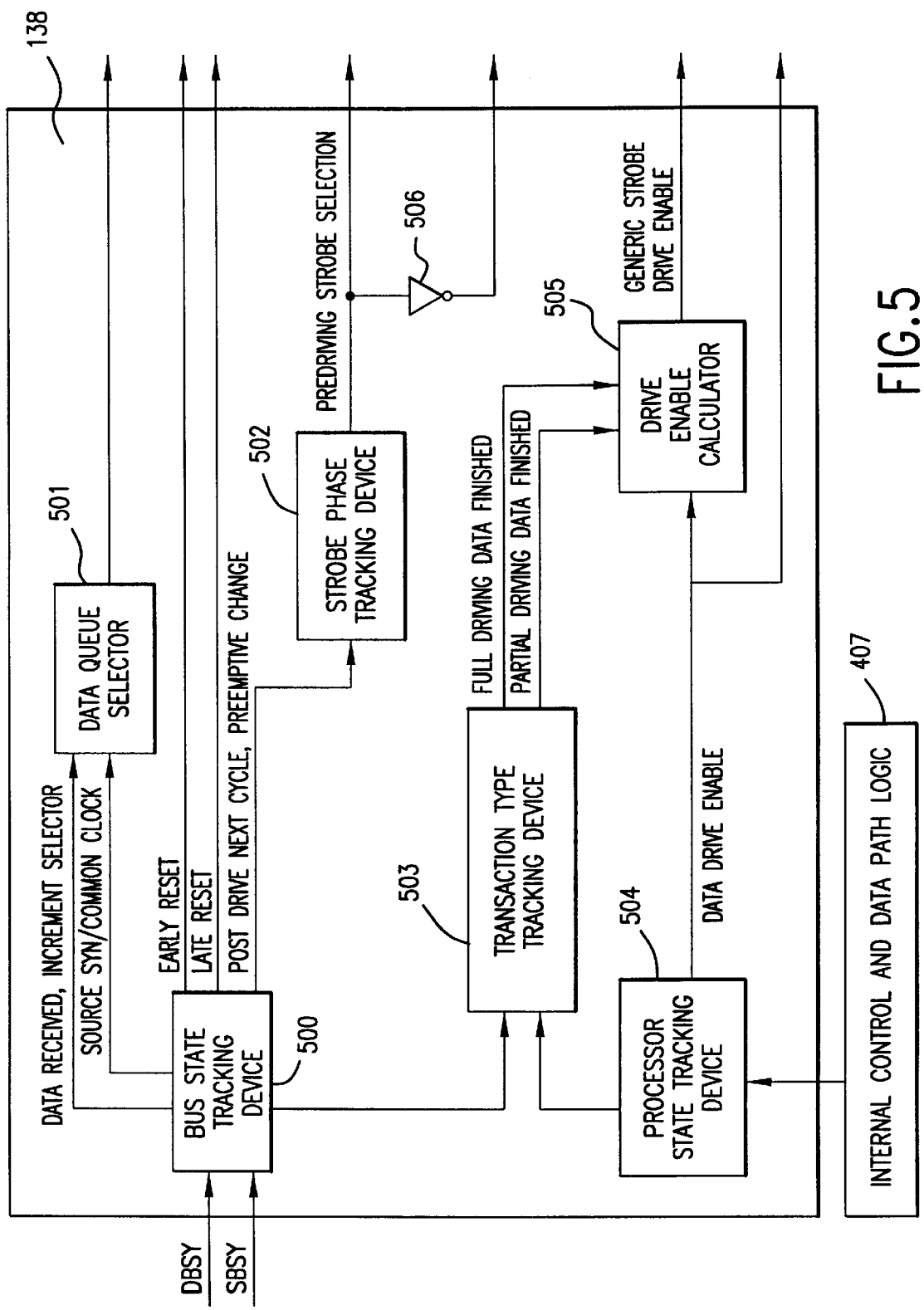
FIG. 5 is a block diagram of a bus controller according to an embodiment of the present invention.

FIG. 5 is a block diagram of the features of bus controller 138. Bus controller 138 includes bus state tracking device 500, data queue selector 501, strobe phase tracking device 502, transaction type tracking device 503, processor state tracking device 504 and drive enable calculator 505. As shown in FIG. 5, the bus state tracking device 500, the data queue selector 501 and the strobe phase tracking device 502 are operable when the processor 102 receives information and the bus tracking device 504, the transaction type tracking 503, the processor state tracking device 504 and the drive enable calculator 504 are operational when processor 102 transmits information.

When operating in the transmitting mode, processor 102 asserts the DBSY and the SBSY signals. Bus state tracking device 500 monitors the bus and determines that these signal have been asserted. As shown in FIG. 3, these signals are usually asserted one bus clock before data starts to be driven and usually ends on bus clock before data is stops being driven. Although the DBSY and SBSY signals are represent as shown in FIG. 3, these signals can take many different waveforms without departing from the spirit and scope of the present invention. Whatever waveforms these signal may take, these waveforms are known by each of the processors and agents of the system. According to another embodiment of the present invention, more or fewer that two signal can be used without departing from the spirit and scope of the present invention.

The outputs from the bus state tracking device include outputs to the data queue selector at 501, an output to strobe phase tracking device 502, and output to transaction type tracking device 503 and output to data and strobe buffers. Referring to the data queue selector 501, one input from the bus state tracking device is a data received, increment selector signal. This signal provides an indication to the latches of the input data buffer to send data to the core of the receiving processor. By the time the signals are asserted it is guaranteed that the data is at the receiving agent.

Another input to the data queue selector 501 is the source synchronous/common clock select signal. This signal indicates the speed at which the clock is running. For example, the bus clock could be running in a source synchronous mode or a common clock mode.

Bus state tracking device also sends a signal to strobe phase tracking device 502. This signal provides a post drive next cycle signal to preemptively change the strobe phase being tracked. According to an embodiment of the present invention, the strobe phase tracking device preemptively assumes or speculates that a master changeover occurred at the end of every incoming write transaction. This is determined based on the state of the bus. Later if a master changeover did not occur, the phase is reset. This is possible because if there is no changeover, the bus is then idle, allowing for the time needed to reset. The output of the strobe phase tracking device is sent to the strobe output buffers, one being the inverted signal of the other via inverter 506. This allows the STBp and STBn output buffers to be identical.

Bus state tracking device 500 also outputs a late reset signal and an early reset signal. The late reset signal resets the data input buffers, and the STBp and STBn input and output buffers. In addition, the late reset, ensure that a reset occurs after the post-drive edge of the strobe is received on the second idle bus clock as shown in FIG. 3. The early reset signal resets any of the other components in processor 102. The early reset is used to initialize output buffers in the event that the processor might have to pre-drive on the second bus idle cycle. Both of the early and the late reset signals are triggered when the processor determines that there will be two consecutive bus cycles.

With respect to processor 102 functioning as a transmitting processor, transaction type tracking device 503 receives inputs from the bus state tracking device and the processor state tracking device 504 which monitors the status of the processor. The output from the transaction type tracking device (which determines whether partial or full data is being transmitted) is sent to a drive enable calculator 505 which stops the driving of the strobe asserted by the processor state tracking device. The output from drive enable calculator 505 is sent to the strobe output buffers and the output from the processor state tracking device is sent to the data output buffer.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

We claim:

1. A method for ensuring proper strobe pre and post driving between a first data transfer and a second data transfer comprising:

generating a first strobe signal and a second strobe signal;

pre-driving one of said first and second strobe signals before the first data transfer;

determining which of said first and second strobe signals will be post driven; and pre-driving one of said first and second strobe signals before the second data transfer.

2. The method according to claim 1 further comprising predicting that a master changeover occurred at the end of the first data transfer.

3. The method according to claim 1, wherein said determining which of said first and second strobe signal will be post driven is determined by a bus state.

4. The method according to claim 2 comprising pre-driving the other of said first and second strobe signals before the second data transfer.

5. The method according to claim 2, comprising the pre-driving said one of the first and second strobe signal before the second data transfer.

6. The method according to claim 1, wherein said first data transfer is requested by a first agent.

7. The method according to claim 1, wherein said second data transfer is requested by a second agent.

8. The method according to claim 1, comprising determining which of said first and second strobe signals will be post driven with a strobe phase tracking device.

9. The method according to claim 1, further comprising generating a signal indicating a strobe signal is about to be transmitted.

10. The method according to claim 1, further comprising generating a signal indicating data is about to be transmitted.

11. An apparatus for transferring data in a computer system comprising: a bus coupled to a plurality of agents;

said plurality of agents each including a bus controller that controls the bus during certain data transfers involving the plurality of agents wherein said bus controller generates a first strobe signal and a second strobe signal, pre-drives one of said first and second strobe signals before the first data transfer, determines which of said first and second strobe signals will be post driven, and pre-drives one of said first and second strobe signals before the second data transfer.

12. The apparatus according to claim 11 wherein said bus controller predicts that a master changeover occurred at the end of the first data transfer.

13. The apparatus according to claim 11, wherein said bus controller determines which of said first and second strobe signal will be post driven by a bus state.

14. The apparatus according to claim 12 wherein said bus controller pre-drives the other of said first and second strobe signals before the second data transfer.

15. The apparatus according to claim 12 wherein said bus controller pre-drives said one of the first and second strobe signal before the second data transfer.

16. The apparatus according to claim 11, wherein said first data transfer is requested by a first agent.

17. The apparatus according to claim 11, wherein said second data transfer is requested by a second agent.

18. The apparatus according to claim 11, wherein said bus controller includes a strobe phase tracking device which determines which of said first and second strobe signals will be post driven.

19. The apparatus according to claim 11, wherein said bus controller generates a signal indicating a strobe signal is about to be transmitted.

20. The method according to claim 11, wherein said bus controller generates a signal indicating data is about to be transmitted.

21. The apparatus according to claim 11, wherein said bus controller receives a signal indicating a strobe signal is about to be transmitted.

22. The method according to claim 11, wherein said bus controller receives a signal indicating data is about to be transmitted.

23. A computer system comprising:
   a bus having a bus clock, said bus comprising a data bus;
   a first agent, including a first bus controller, coupled to said bus; and
   a second agent, including a second bus controller, coupled to said bus, one of said first and second bus controllers generating a first strobe signal and a second strobe signal clocking data in a first and a second data transfer, said first data transfer being pre-driven by one of said first strobe and said second strobe signals and said second data transfer being pre-driven by the other of said first strobe and second strobe signals, said one of said first and second bus controllers also determining which of said first and second strobe signals will be post driven.

* * * * *